United States Patent [19]

Wessely

[11] E Re. 29,307

[45] Reissued July 19, 1977

[54] MANUFACTURE OF METALLIC CONTAINERS

[75] Inventor: Eugène Wessely, Colombes, France

[73] Assignee: Futs Metalliques Gallay S.A., Paris, France

[21] Appl. No.: 699,265

[22] Filed: June 24, 1976

Related U.S. Patent Documents

Reissue of:

[64] Patent No.: 3,425,381
Issued: Feb. 4, 1969
Appl. No.: 558,352
Filed: June 17, 1966

[30] Foreign Application Priority Data

June 18, 1965 France ..... 65.21391

[51] Int. Cl.[2] ..... B21D 51/32

[52] U.S. Cl. ..... 113/120 R; 113/30; 113/120 Y

[58] Field of Search ..... 113/1 E, 19, 24 E, 30, 113/120 K, 120 Y; 220/67

[56] References Cited

U.S. PATENT DOCUMENTS

| | | | |
|---|---|---|---|
| 475,656 | 5/1892 | Bertels | 220/79 |
| 2,197,439 | 4/1940 | Sebell | 220/67 |
| 2,337,452 | 12/1943 | Compo | 113/120 Y |
| 2,460,296 | 1/1949 | Kinney | 113/120 |
| 2,555,700 | 6/1951 | O'Neil | 113/120 Y |
| 3,030,900 | 4/1962 | Munschauer | 113/30 |
| 3,160,312 | 12/1964 | Johnston | 220/67 |

FOREIGN PATENT DOCUMENTS

| | | | |
|---|---|---|---|
| 638,632 | 6/1950 | United Kingdom | 113/120 Y |

*Primary Examiner*—Michael J. Keenan
*Attorney, Agent, or Firm*—Young & Thompson

[57] ABSTRACT

A process for securing bases in the ends of metallic container bodies by [upsetting] *rolling by a seaming roll* contiguous peripheral portions of the bases and container ends, in which overlapping bent-over peripheral base and container end portions are [knurled to roll them over] *rolled together by a seaming roll* to produce a joint having seven superposed thicknesses of the base and the container body. [At the end of] *During* the roll-over movement, a [polymerized] *polymerizable* liquid is injected between at least some of the thicknesses of the metal of the base and container body.

6 Claims, 15 Drawing Figures

INVENTOR
EUGENE WESSELY
By Young & Thompson
ATTYS.

INVENTOR

EUGENE WESSELY

BY Young + Thompson

ATTYS.

INVENTOR
EUGENE WESSELY
BY Young & Thompson
ATTYS.

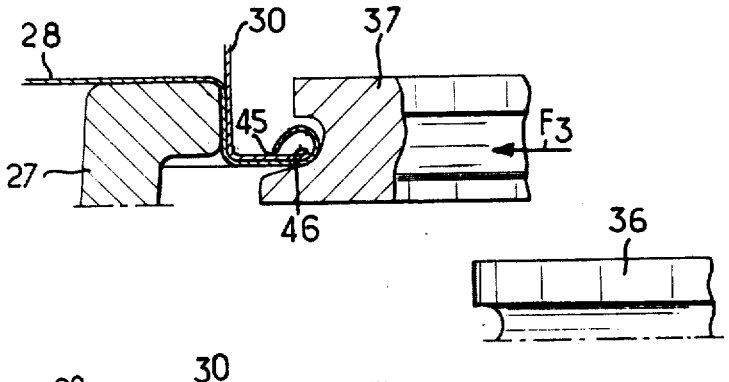
FIG.11
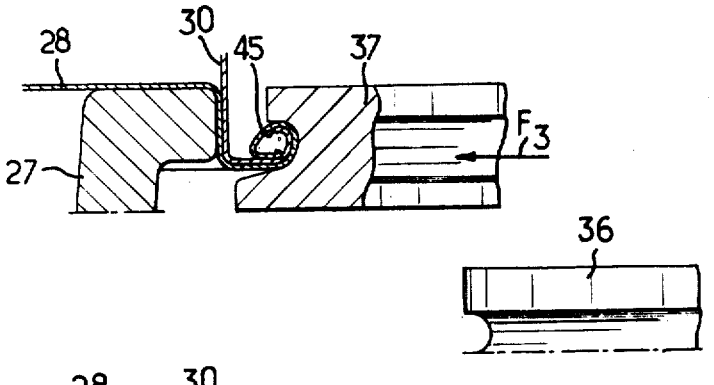
FIG.12
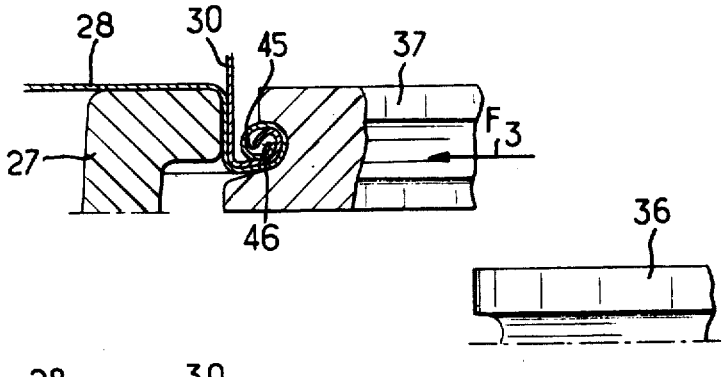
FIG.13
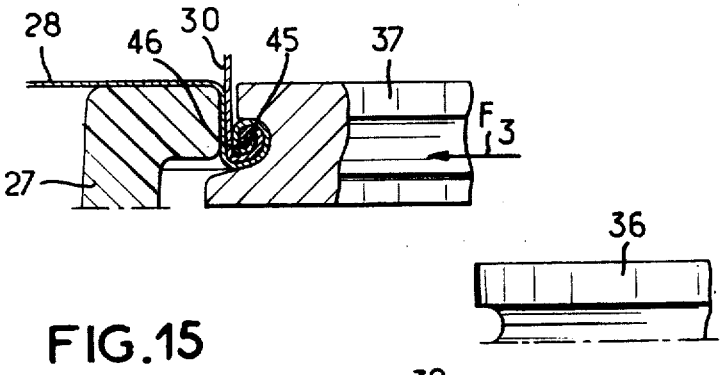
FIG.14
FIG.15
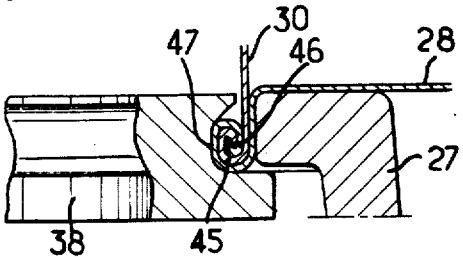
INVENTOR
EUGENE WESSELY
By Young & Thompson
ATTYS.

MANUFACTURE OF METALLIC CONTAINERS

Matter enclosed in heavy brackets [ ] appears in the original patent but forms no part of this reissue specification; matter printed in italics indicates the additions made by reissue.

The present invention relates to improvements in the manufacture of metallic containers such as casks.

In known methods of making casks and like containers the bottoms or bases are assembled onto bodies or onto securing rings by [upsetting] *seaming by a seaming roll* the contiguous edges of bases and containers.

Such containers in the course of handling during use, have to withstand shocks which cause such deformation thereof that they deteriorate to the point that the containers often become unusable. It has already been proposed to reinforce the joints by hoops or stiffeners, but in the manufacture of the casks difficulties arise which considerably increase the cost of manufacture.

It has also been proposed to reinforce the joints by forming a further [crease] *fold* in the normal [upset] *seamed* edges so that the joints thus obtained instead of the normal five thicknesses of material have seven thicknesses imparting substantially increased resistance to shocks to the casks or like containers. This technique has proved to be somewhat impracticable and complex mainly due to the necessity of preparing the bases and the securing rings to be assembled and also due to the operations of transferring and adapting the casks in the course of manufacture on machines equipped to carry out the several phases of cask or like container manufacture.

This long and difficult manufacturing process is not satisfactory and is not suitable for large scale commercial production.

The main object of the present invention is to provide a simple process of making casks and like containers using the triple [upsetting] *seaming* process in which the casks or like containers are made by a continuous process in the minimum time, and in one pass through the operating tools.

According to the present invention a process of [upsetting] *seaming* the bases of metallic containers, such as casks or the like comprises rolling a bent over edge of a base, and a container sleeve rim associated therewith by forcing the metal progressively radially backwards on itself in a direction perpendicular to the longitudinal axis through the container while rotating the container, so that the edge of the base is first continuously [upset] *rolled* alone round the rim of the container sleeve, and thereafter the metal of the edge of the base and the container rim are [together] continuously [upset by rolling] *rolled together* until a [threefold] *triple* roll over joint is obtained.

In order that the invention may be more fully understood an embodiment in accordance therewith will now be described by way of example with reference to the accompanying drawings in which:

FIGS. 11 to 14 show the course of the rolling operations:

FIG. 15 shows the [upset] *seam* joint obtained.

Figure 1:
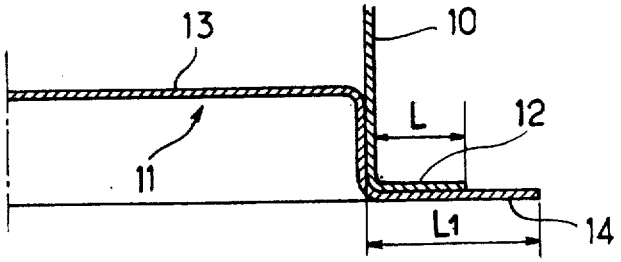
FIG. 1 shows partly in cross-section the body and the base of a cask or like container prior to the [upsetting] *seaming* operations.

Referring to FIGS. 1 to 6 these show the wall 10 of the body or sleeve of a cask to which a base 11 is to be secured. The body or sleeve 10 as seen in FIG. 1 has a bent over edge 12, while the base has a recessed part 13 to be disposed in the body 10 and a peripheral edge extension 14. The length L of the bent over edge of the body and the length $L_1$ of the edge of the base are selected to provide the necessary material for making the roll over profile as a function of the sliding movement between the parts and the path taken by each edge, and is dependent on the material used and its thickness.

Referring to FIGS. 2 to 5 these show the various phases of shaping the sheet e.g. of iron for making a cask with bases, the edges of the bodies and bases rolled over to form firm joints.

Figure 2:
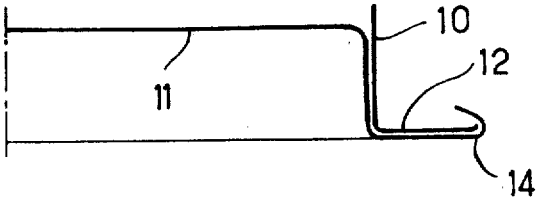
FIGS. 2 to 5 show diagrammatically different phases of shaping the assembled cask or like container.
Figure 3:
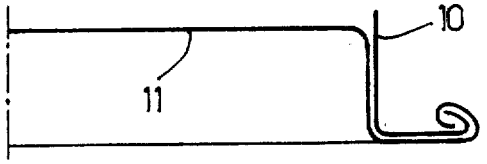
Figure 4:
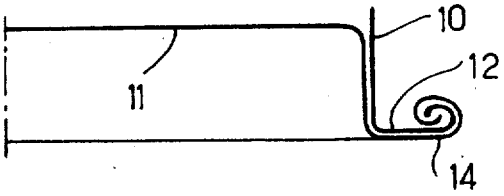
Figure 5:
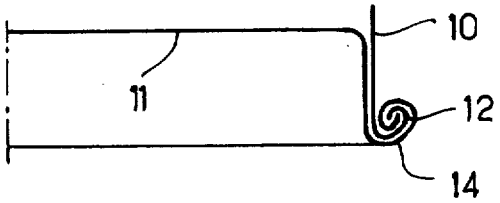

In FIG. 2 the sheet metal base part $L_1$ projecting over the bent over edge L of the sleeve, is suitably forced back over the cask edge 12, and FIGS. 3 and 4 show intermediate roll over [deformations] *shapes* to produce the profile in FIG. 5.

At this stage the assembly of the base with the sleeve is completed and the successive [upsetting or] rolling operations form a joint having seven thicknesses 15 to 21 of sheet iron, which impart great resistance to the joint; by this [upsetting] *rolling* process, this joint has some play between the thicknesses of the metal and lacks the tightness for a good seal; in some cases using this process the necessary seal is provided by filling the spaces between the thicknesses of metal with a [polymerised] *polymerisable* liquid [joint] *sealant* by any suitable means.

However to ensure that the [upset material] *completed seam* has the maximum resistance and at the same time it is tight enough to withstand all tests, the profile obtained at the end of the rolling is [crushed which closely binds] *flattened by further rolling thus binding* the sheet iron of the edges of the base and of the sleeve. This [crushing] *flattening* could also be effected after a liquid *sealant* joint had been injected in the spaces between the sheet iron.

Figure 6:
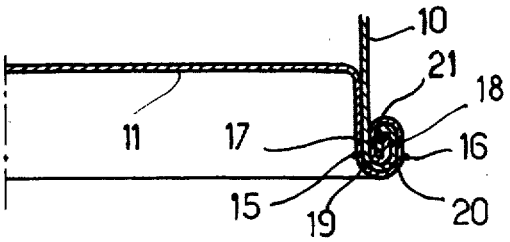
FIG. 6 shows a cross-section of [threefold upsetting] *a triple seam* on an enlarged scale.

When the [crushing] *flattening* is carried out the joint has a cross-section having seven thicknesses of metal as seen in FIG. 6.

Such a joint which is simple and stout ensures effectively, without any stiffener or hoop being added to the number of parts forming the cask, a sufficiently tight joint despite the unavoidable deformations arising from handling the casks in use.

Figure 7:
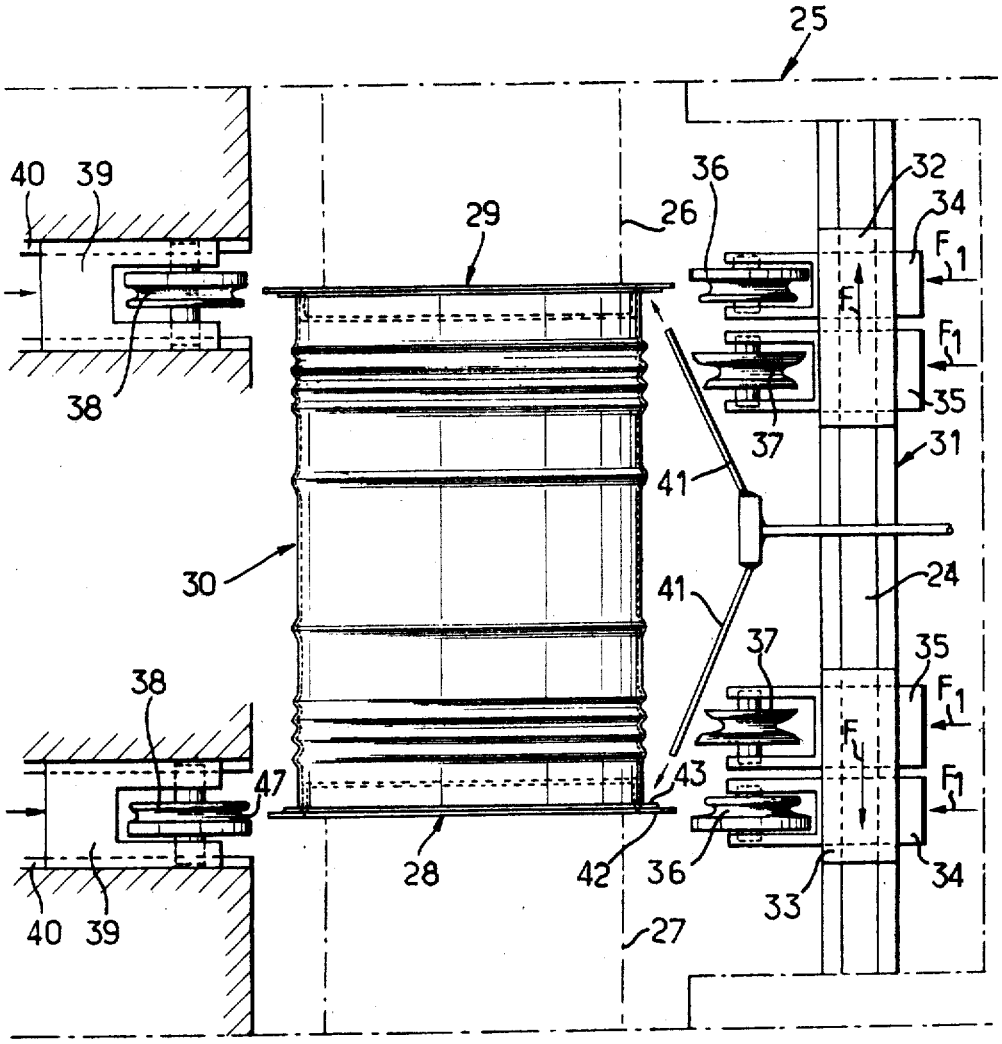
FIG. 7 shows diagrammatically an apparatus for obtaining the threefold [upsetting] *rolling;*

In a preferred embodiment shown diagrammatically in FIG. 7, the [upsetting] *seaming* device is mounted on [an upsetting] *a seaming* machine of the conventional type shown generally at 25. This machine comprises in the known manner two rotating and axially movale mandrels 26, 27 for supporting the cask during the [upsetting] *seaming* of its bases 28 and 29 previously engaged in the corresponding terminal portions of the sleeve 30.

The [upsetting] *seaming* device disposed radially with respect to each base is disposed on a common support 31 carried by the frame of the machine, and comprises two [knurling tool] *seaming roll* carrier bodies 32, 33, movable in the direction of the arrows F on a slide 24 parallel to the longitudinal axis through the cask sleeve 30.

Each of the bodies 32, 33 carries on members 34, 35 sliding in a direction perpendicular to the slide 24 (arrow F1) first and second [knurling tools] *seaming rolls* 36, 37 respectively.

The [knurling tool] *seaming roll* bodies 32, 33 are driven by any suitable known device (not shown) simultaneously displaced in two opposite directions; it will be obvious that the movement of these bodies could be carried out in the same direction by a suitable arrangement of the [knurling] *seaming* tools.

The frame of the machine carries [the so-called pressure knurling tools] *flattening rolls* 38, preferably disposed, as shown on the diametrical side of the cask sleeve to the [knurling tools] *seaming rolls* 36, 37 and perpendicular to the axis of the cask, on slides 39 which slide in guides 40.

Means 41 are also preferably provided as shown to project, if so desired, a polymerisable liquid [jointing material] *sealant* between the thickness of the sheet metal during the [upsetting or] rolling operation.

Figure 8:
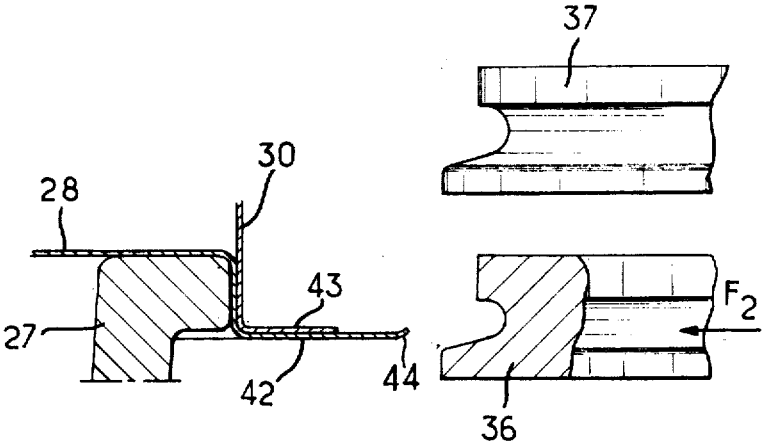
FIGS. 8 to 10 show on an enlarged scale phases of rolling the edge of the base on the [sleeve ring] *body flange* during the [upsetting] *seaming;*
Figure 9:
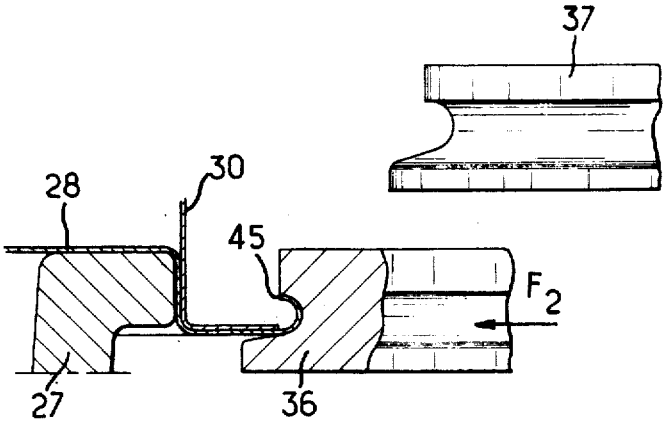
Figure 10:
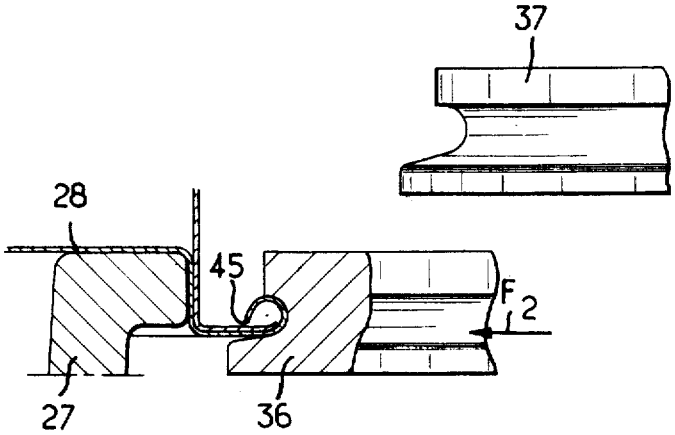

Referring to FIGS. 8 to 10 these show a phase in joining a base 28, comprising a bent over edge 42, with a sleeve 30 comprising a sleeve rim 43.

The bent over edge of the base preferably comprises as shown a peripheral upturned edge 44 to limit the wear of the throat on the [knurling tool] *seaming roll* 36; however, this edge is not essential since the rolling of the sheet iron can be similarly effected without it.

The rim of the sleeve and the bent over edge have dimensions which are such as to provide the material necessary for obtaining a triple [upsetting] *seam* with seven thicknesses of the metal sheet.

In a first pass through the tools, the mandrels are rotated to drive the cask sleeve 30 at a predetermined speed; the [knurling tool] *seaming roll* 36 is brought opposite the rim of the sleeve and the bent over edge and actuated in such a way that it moves radially and continuously (in the direction of the arrow F2) towards the longitudinal axis through the cask; in the course of its movement the [knurling tool] *seaming roll,* arriving in contact with the terminal part of the bent over edge and passing in front of it, pushes back this edge imparting such a profile to it that at the end of the advance of the [knurling tool] *seaming roll,* the terminal part of the bent over edge of the base is rolled, having its end 45 located facing the rim of the sleeve as shown in FIG. 10.

The [knurling tool] *seaming roll* 36 is at that instant withdrawn to its starting position and the block 33 is moved to bring the [knurling tool] *seaming roll* 37 (FIGS. 11 to 14) opposite the aforesaid rolled over metal, then the [knurling tool] *seaming roll* 37 is driven in continuous radial displacement (in the direction of the arrow F3) towards the cask which is still being rotatably driven.

When the [knurling tool] *seaming roll* 37 engages the rolled over metal formed by the previous [knurling tool] *seaming roll,* its continuous radial displacement and the appropriate profile of its throat cause the sheet metal to be [deformed, rolling] *formed and rolled* back on itself in proportion to the combined movements of rotation of the cask and the continued advance respectively of the [knurling tool] *seaming roll.*

As seen in FIG. 14 a triple [upsetting] *seam* is obtained with seven thicknesses of sheet metal, with a minimum of starting material, due to the fact that the ends 45 and 46 of the rim of the sleeve and the bent over edge, are interengaged over a minimum length which enables a very low [upsetting] *seam* to be obtained.

At the moment that the assembly of the bases with the sheet metal is carried out, the [knurling tool] *seaming roll* 37 is driven back to its starting position and the mandrels are stopped, after which the cask may be directed to a following position.

However, after the [knurling tool] *seaming roll* 37 has been returned to its starting point, a final operation may be carried out if desired, which consists in [smoothing out] *flattening* the [upsetting] *seam obtained with the* [knurling tool] *seaming roll* 38 having an appropriate profile 47, this phase being shown in FIG. 15.

It will be understood that the continuous [upsetting] *rolling* of the sheet metal has the advantage of modifying the original structure of the metal, [which is in some way matted] giving it increased rigidity.

Such a process and apparatus are simple to operate and enable casks or like containers to be produced capable of effectively resisting unavoidable shocks which such containers have to undergo in the course of usage.

It is also possible with the process and apparatus described to make containers of the type of all sizes formed by a complex metal plastic or other similar material having a cylindrical section and the process may be employed for forming containers having square, rectangular or other shapes; in that case it would be of advantage to fix the container, while the [knurling tool] *seaming roll* or [tools] *rolls* are movable parallel to the periphery of the containers.

While the apparatus described comprises a pair of [knurling tools] *seaming rolls* radially arranged with respect to each base a single [knurling tool] *seaming roll* movable radially with respect to each base may be employed to [upset] *roll* each base to a suitable profile.

I claim:

[1. A process of securing bases in the ends of metallic container bodies by upsetting contiguous peripheral portions of the bases and container ends, comprising supporting a container body, inserting a recessed base portion within the container body end with overlapping bent-over peripheral base and container end portions, said base peripheral portion extending beyond the container end peripheral portion, moving a knurling tool radially towards said edge portions and effecting continuous relative rotary movement between said container and contiguous base on the one hand and said tool on the other hand about the longitudinal axis of said container body to upset said base peripheral portion on itself in a continuous roll-over movement, and effecting further movement of said tool radially with respect to said base and container body successively to roll said base and body edge portions together over each other until a roll-over joint between said base and body edge sections is formed which consists of seven superposed thicknesses of said base and container body.]

2. A process according to claim [1] *5* wherein at the end of said roll over movements said joint is [crushed] *flattened.*

3. A process according to claim [1] *5* wherein [at the end of] *during* said roll over movement a [polymerised] *polymerisable* liquid product is injected between at least some of the thicknesses of the metal of said base and container body.

[4. A process of securing bases in the ends of metallic container bodies by upsetting contiguous peripheral portions of the bases and container ends, comprising supporting a container body, inserting a recessed base portion within the container body end with overlapping bent-over peripheral base and container end portions, said base peripheral portion extending beyond the container end peripheral portion, moving a knurling tool radially towards said edge portions and effecting continuous relative rotary movement between said container and contiguous base on the one hand and said tool on the other hand about the longitudinal axis of said container body to upset said base peripheral portion on itself in a continuous roll-over movement, and effecting further movement of said tool radially with respect to said base and container body successively to roll said base and body edge portions together over each other until a roll-over joint between said base and body edge sections is produced, and at the end of said roll-over movement injecting a polymerized liquid product between at least some of the thicknesses of the metal of said base and container body.]

*5. A process of connecting bases in the ends of metal container bodies by seaming together contiguous peripheral portions of the bases and the container body ends, comprising supporting a container body, inserting a recessed portion of a base within one end of the container body, a bent over peripheral portion of the base and a bent over peripheral portion of the container body end freely overlying each other with the base peripheral portion extending radially beyond the container end peripheral portion, moving a seaming tool radially towards the still free edges of said peripheral portions while effecting continuous rotary movement of said container body and base relative to said tool about the longitudinal axis of said container body to force said base peripheral portion alone on itself in a continuous roll-over movement around the edge of the container end peripheral portion until the outer extremity of the base peripheral portion faces said container end peripheral portion, and effecting further movement of said tool radially inwardly with respect to said base and container body progressively to roll said base peripheral portion and said container end peripheral portion together over each other during which further movement said outer extremity of said base peripheral portion is displaced relative to its position facing said container end peripheral portion and continuing said further movement until a roll-over joint between said base and container end peripheral portions is formed which consists of seven superposed alternating thicknesses of said base and container body peripheral portions.*

*6. A process of connecting bases in the ends of metal container bodies by seaming together contiguous peripheral portions of the bases and the container body ends, comprising supporting a container body, inserting a recessed portion of a base within one end of the container body, a bent over peripheral portion of the base and a bent over peripheral portion of the container body end overlying each other with the base peripheral portion extending radially beyond the container end peripheral portion, moving a seaming tool radially towards the edges of said peripheral portions while effecting continuous rotary movement of said container body and base relative to said tool about the longitudinal axis of said container body to force said base peripheral portion on itself in a continuous roll-over movement around the edge of the container end peripheral portion until the edge of the base peripheral portion faces said container end peripheral portion, thereafter driving the edge of the base peripheral portion radially outwardly along the container peripheral portion, and effecting further movement of said tool radially inwardly with respect to said base and container body progressively to roll said base peripheral portion and said container end peripheral portion together over each other until a roll-over joint between said base and container end peripheral portions is formed which consists of seven superposed thicknesses of said base and container body peripheral portions.*

*7. A process of connecting bases in the ends of metal container bodies by seaming together contiguous peripheral portions of the bases and the container body ends, comprising supporting a container body, inserting a recessed portion of a base within one end of the container body, a bent over peripheral portion of the base and a bent over peripheral portion of the container body end overlying each other with the base peripheral portion extending radially beyond the container end peripheral portion, moving a seaming tool radially towards the edges of said peripheral portions while effecting continuous rotary movement of said container body and base relative to said tool about the longitudinal axis of said container body to force said base peripheral portion on itself in a continuous roll-over movement around the edge of the container end peripheral portion until the base peripheral portion forms an initial rolled section with its outer edge disposed along a line spaced from said container body, and effecting further movement of said tool radially inwardly with respect to said base and container body progressively and causing said base peripheral portion and said container end peripheral portion to roll together over each other while the outer edge face of said base peripheral portion is displaced along said container end peripheral portion relative to its position upon the completion of the initial rolled section until said edges of said peripheral portion interengage thus forming a roll-over joint between said base and container end peripheral portions which consists of seven superposed thicknesses of said base and container body peripheral portions.*

*8. A process of connecting bases in the ends of metal container bodies by seaming together contiguous peripheral portions of the bases and the container body ends, comprising supporting a container body, inserting a recessed portion of a base within one end of the container body, a bent over peripheral portion of the base and a bent over peripheral portion of the container body end overlying each other with the base peripheral portion extending radially beyond the container end peripheral portion, moving a seaming tool radially towards the edges of said peripheral portions while effecting continuous rotary movement of said container body and base relative to said tool about the longitudinal axis of the container body (a) initially to roll the outer edge of said base peripheral portion through substantially 270° around the outer edge of the container peripheral portion until said outer edge of the base peripheral portion comes into substantially immediate facing relation with the container peripheral portion along a line spaced inwardly from the edge of the container peripheral portion on the surface thereof which is continuous with the outside surface of the container, and (b) then to roll both the base and container body peripheral portions together while allowing relative displacement over one another until the container body portion has been rolled through substantially 270°, and then continuing deformation of the resulting rolled, interengaged base and container body peripheral portions thereby forming a seam consisting of seven superposed thicknesses of alternate base and container body.*

* * * * *

UNITED STATES PATENT AND TRADEMARK OFFICE

CERTIFICATE OF CORRECTION

PATENT NO. : Re. 29,307

DATED : July 19, 1977

INVENTOR(S) : Eugene WESSELY

It is certified that error appears in the above-identified patent and that said Letters Patent are hereby corrected as shown below:

Column 2, line 62, correct the spelling of "movable".

Column 3, line 30, change "on" to --of--.

Column 4, lines 13 and 14, remove the italicized words "seam obtained with the" and replace them by words which are not italicized, because these words were in the original patent.

UNITED STATES PATENT AND TRADEMARK OFFICE

CERTIFICATE OF CORRECTION

PATENT NO. : Re. 29,307
DATED : July 19, 1977
INVENTOR(S) : Eugene WESSELY

It is certified that error appears in the above-identified patent and that said Letters Patent are hereby corrected as shown below:

On the title sheet of the patent, under [56] References Cited, add the four uncited references called to the attention of the Patent Office in the "Citation of Prior Art by Applicant Under MPEP 707.05(b)", which was filed September 13, 1976, as follows:

| | | |
|---|---|---|
| Courtright et al. | U.S. 2,078,530 | Apr, 27, 1937 |
| Defauw | U.K. 506,182 | May 14, 1939 |
| Defauw | French 829,921 | Apr. 25, 1938 |
| Peeters | Belgian 432,203 | Apr. 30, 1940 |

Signed and Sealed this

Second Day of May 1978

[SEAL]

Attest:

RUTH C. MASON
Attesting Officer

LUTRELLE F. PARKER
Acting Commissioner of Patents and Trademarks